(12) United States Patent
Reime

(10) Patent No.: US 7,456,815 B2
(45) Date of Patent: Nov. 25, 2008

(54) OPTOELECTRONIC DEVICE FOR POSITION AND/OR MOVEMENT DETECTION AS WELL AS THE ASSOCIATED METHOD

(76) Inventor: Gerd Reime, Friedenstrasse 88, D-75328 Schömberg (DE)

( * ) Notice: Subject to any disclaimer, the term of this patent is extended or adjusted under 35 U.S.C. 154(b) by 248 days.

(21) Appl. No.: 10/484,049

(22) PCT Filed: Jul. 9, 2002

(86) PCT No.: PCT/EP02/07605

§ 371 (c)(1),
(2), (4) Date: Jan. 16, 2004

(87) PCT Pub. No.: WO03/009476

PCT Pub. Date: Jan. 30, 2003

(65) Prior Publication Data

US 2004/0217267 A1    Nov. 4, 2004

(30) Foreign Application Priority Data

Jul. 16, 2001    (DE) .............................. 101 33 823

(51) Int. Cl.
*G09G 3/3637* (2006.01)
(52) U.S. Cl. .......................... 345/98; 345/55; 345/204; 345/205
(58) Field of Classification Search ................ 345/156, 345/173–175, 98, 55, 204–205; 250/221
See application file for complete search history.

(56) References Cited

U.S. PATENT DOCUMENTS 5,103,085 A * 4/1992 Zimmerman ................ 250/221

(Continued)

FOREIGN PATENT DOCUMENTS

DE    196 54 853    11/1997

(Continued)

OTHER PUBLICATIONS

International Search Report for PCT/EP02/07605 dated Nov. 7, 2002.

*Primary Examiner*—Richard Hjerpe
*Assistant Examiner*—Leonid Shapiro
(74) *Attorney, Agent, or Firm*—Cantor Colburn LLP

(57) ABSTRACT

Optoelectronic device and method for detecting the position and/or movement of an object, the device and method include: a plurality of transmitters for emitting radiation, at least one receiver for receiving the radiation emitted by the transmitters and reflected back by the object or the radiation emitted from transmitters associated with the object, a plurality of mutually different radiation paths, which are formed between at least a part of the transmitters, the object and the receivers or between transmitters associated with the object and the receivers, a timing circuit for cycled switching of the transmitters of the different radiation paths, an evaluation device, which converts the signals received by the receivers for the different radiation paths into values for detection of the position and/or movement of the object along a line or in a surface, wherein for three-dimensional detection of the position and/or movement of the object, the timing circuit switches a plurality of, but at least a part of the transmitters and/or receivers in at least one further cycle such that the space, into which the transmitters emit, is illuminated nearly uniformly, and that the evaluation device determines a value for determination of the distance of the object from the line or surface on the basis of the radiation radiated or radiated back by the object during the further cycle.

37 Claims, 7 Drawing Sheets

U.S. PATENT DOCUMENTS 6,169,379 B1 * 1/2001 Zhang et al. .................. 318/280
6,501,012 B1 * 12/2002 Toba et al. .................... 84/724
6,504,143 B2 * 1/2003 Koops et al. ................. 250/221

FOREIGN PATENT DOCUMENTS

| | | |
|---|---|---|
| DE | 100 01 955 | 7/2001 |
| EP | 0 551 240 | 7/1993 |
| EP | 0 706 648 | 1/1995 |
| GB | 2 190 488 | 11/1987 |
| JP | 58-147670 | 9/1983 |
| JP | 8-273503 | 10/1996 |

* cited by examiner

OPTOELECTRONIC DEVICE FOR POSITION AND/OR MOVEMENT DETECTION AS WELL AS THE ASSOCIATED METHOD

REFERENCE TO RELATED APPLICATIONS

The present application claims the priority of the German Patent Application 101 33 823.6 filed on 16.07.2001, the disclosure content of which is herewith expressly also made the subject of the present application.

1. Field of the Invention

The invention relates to an optoelectronic device as well as a method for detecting the position and/or movement of an object.

2. Prior Art

An optical system for detecting a change in the reflection at an object is known from EP 706648 A1, in which changes in extraneous or ambient light have no influence on the measured value. This system is essentially used as windscreen wiper sensor for detecting raindrops striking against a windscreen, but may equally be used as a proximity sensor. If the optoelectronic measurement paths are of flat configuration therein, two-dimensional values may be determined for determination of the position and/or movement of an object.

Such devices are also known in the form of movement-sensitive operating surfaces. There are fixed units of this type in many applications, e.g. in laptops as a space-saving single button solution or as a relatively large flat element. The single button version reacts sensitively to lateral pressure. In the flat solution, the surface is touched with a finger or a special stylus for control of the cursor, and as a result of movement of the operating element, the finger or stylus, on this two-dimensional plane a visible element, e.g. a cursor, moves on the screen in a corresponding manner. These operating elements control the cursor only when the operating surface is directly touched, e.g. if the finger is lifted from the operating surface, the cursor disappears or remains motionless.

An arrangement is known from older DE 100 01 955 A1, in which two light sources—one radiating outwards and one radiating exclusively onto the receiver—are disposed such that an approach of an operating element, e.g. a finger, as well as the pattern of movement when the operating surface is touched are recognized. Upon impact on the operating surface, a reference value is formed, which corresponds to the measured value, which arises shortly before the finger touches the operating surface, in order to prevent only slight movements of the operating elements from resulting in contact of the finger no longer being recognized. Only when the finger is lifted again so far from the movement-sensitive operating surface that the previously determined measured value is not reached, is the finger recognized as having been lifted. The pattern of movement is detected in this case so that intentional operations can be distinguished from unintentional operations.

In addition, navigation systems are known, which assist the driver to find his destination especially in regions unknown to him. These navigation systems were hitherto operated via manual operating elements such as rotary and touch contact switches or via operating elements integrated in the steering wheel. However, since the user has to input his traveling route in accordance with the prerequisites of the respective system, distraction easily occurs essentially as a result of the type of operation.

SUMMARY OF THE INVENTION

Working from this prior art, the object forming the basis of the present invention is to provide an optoelectronic device or method, which also allows detection of a position in the third dimension.

An optoelectronic device and method for detecting the position and/or. movement of an object, the device and method include: a plurality of transmitters for emitting radiation, at least one receiver for receiving the radiation emitted by the transmitters and reflected back by the object or the radiation emitted from transmitters associated with the object, a plurality of mutually different radiation paths, which are formed between at least a part of the transmitters, the object and the receivers or between transmitters associated with the object and the receivers, a timing circuit for cycled switching of the transmitters of the different radiation paths, an evaluation device, which converts the signals received by the receivers for the different radiation paths into values for detection of the position and/or movement of the object along a line or in a surface, wherein for three-dimensional detection of the position and/or movement of the object, the timing circuit switches a plurality of, but at least a part of the transmitters and/or receivers in at least one further cycle such that the space, into which the transmitters emit, is illuminated nearly uniformly, and that the evaluation device determines a value for determination of the distance of the object from the line or surface on the basis of the radiation radiated or radiated back by the object during the further cycle.

In principle, a further cycle is provided for detection of the third dimension by the transmitters, and possibly also the receivers, illuminating the space uniformly, so that the distance of the object from the surface may be determined. The usual restriction of the prior known systems to a flat work surface is removed as a result of this. As a result of using radiation such as light radiation, for example, the operating surface can also be disposed behind a surface protecting it, which is permeable to the emitted radiation, e.g. behind a translucent window in the housing or even behind a display or display covering, which is translucent for the wavelength of the emitted radiation, such as the display of an engaged gear on the gearshift lever of a motor vehicle, for example.

There results from this an optoelectronic device, which with respect to its operation essentially corresponds to the capacitive, resistive or inductive solutions used hitherto. In the application of cursor control, the cursor appears on the screen by "touching" the operating surface, by shifting the finger or rolling the fingertip the cursor displayed on the screen shifts in a corresponding manner. However, a movement above the operating surface is detected in addition to this, i.e. also at a distance of some or a few millimeters or centimeters. Thus, the distance measured from the surface of the operating surface is detected at the same time. The value of the instantaneous distance can now control the further function. Thus, switchover into another function plane can be achieved, for example, by removing the finger a few millimeters from the operating surface. The cursor can also be controlled in this function plane by movement of the finger, i.e. also at a distance of few millimeters or centimeters from the operating surface, for example.

A practical example is a control of the detail enlargement in the cursor space, e.g. in a navigation system of a vehicle, controlled by lifting the operating element, e.g. the finger, slightly from the operating surface. Advantageously, the zoomed path can be moved at the same time by also moving the finger accordingly at a distance from the surface. In particular, in motor vehicles a gear display can be provided, for example, on the gearshift lever. However, this display surface is at the same time a movement-sensitive operating surface, which is connected to the navigation system, for example. For example, if the display of the navigation system is disposed in the viewing range of the driver, then the driver only needs to move a finger over this operating surface or roll a fingertip, for example, to search the route. To enlarge the path of the map of the navigation system, he lifts the finger without having to remove his hand from the shift lever and without having to operate further operating elements. The risk of the driver being distracted is clearly reduced. The key function previously necessary can thus be replaced by a purely optical and not mechanical function or operation.

Naturally, such a function may also be reversed so that with a finger position a few centimeters away, for example, a complete overview of a map, for example, may be seen. If the cursor is then positioned accordingly, the part located in the cursor space can be enlarged accordingly by movement towards the operating surface until, with the finger positioned on the operating surface, the enlargement necessary for good legibility is achieved. In this enlarged state, the position of the highlighted path can be varied by shifting the finger or rolling the fingertip. Return to the overview again is simply achieved by moving the finger a few millimeters away from the operating surface.

Further advantages are evident from the sub-claims.

BRIEF DESCRIPTION OF THE FIGURES

The invention is be explained in more detail below on the basis of a practical example.

DETAILED DESCRIPTION OF PREFERRED EMBODIMENTS

Figure 1:
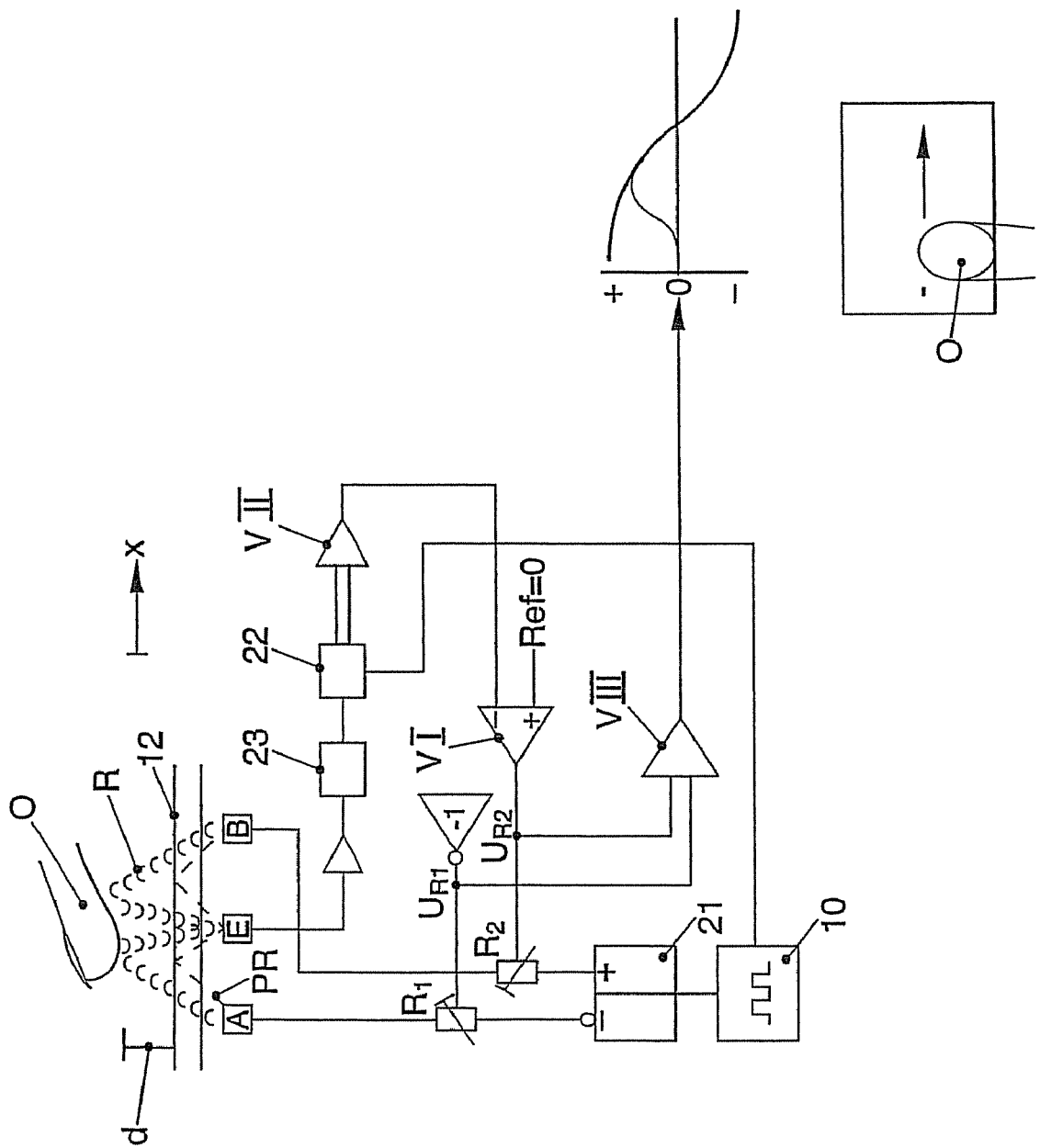
FIG. 1 shows a circuit for a one-dimensional position determination

The invention will now be explained in more detail by way of example with reference to the attached drawings. However, the practical examples are only examples, which should not restrict the inventive concept to a specific arrangement.

The figures show an optoelectronic device for detecting the position and/or movement of an object O, which device has several transmitters A,B,C,D for emitting light radiation. At least one receiver E or E1-E4 is associated with the transmitters to receive the radiation emitted by the transmitters A-D and radiated back by the object O. If the object O itself carries a transmitter, reflection is unnecessary and the radiation is emitted directly by the object. Depending on the connections, several mutually different radiation paths, light paths in the case of light, in which at least part of the transmitters A-D and the at least one receiver E,E1-E4 are involved, are configured between the transmitters, the object and the receivers. The actuation of the transmitters is achieved via an oscillator 10 with inverter 21 as timing circuit.

The signals detected by the receivers are passed to an evaluation unit 11, which firstly converts the signals received by the receivers E,E1-E4 from the different light paths into two-dimensional values x,y for detection of the position and/or the movement of an object O such as a finger, for example, in or along a surface 12. For the three-dimensional detection of the position and/or movement of the object O, in the embodiment of FIG. 7, the timing circuit then switches the transmitters A-D and/or the receivers E,E1-E4 in a further cycle to be effective so that the space, in which the transmitters A-D emit, is illuminated as uniformly as possible with the same cycle operation. The evaluation unit can then determine a value for determination of the distance d of the object O from the surface 12 on the basis of the radiation radiated back by the object O during this further cycle. The values x or y may also be determined only one-dimensionally along a line, or only the distance of the object from a "zero-dimensional" point is detected when a point is touched.

To also enable detection of an object such as an operating element such as a finger or stylus, for example, above the operating surface, radiation, e.g. light, of a specific wavelength, for which the operating surface or surface 12 is permeable, must be emitted. In the simplest case, this is visible light or infrared light. This is reflected back at the object and can be received again below the operating surface. In principle, the "back reflection" may also be achieved as a result of the object itself having a light source. This is conceivable with the use of a joystick, for example, such as that used for crane controls, for example. This joystick is located with its lower end in an space sealed against extraneous or ambient light so that the change in position of the lower end of the joystick can be recognized by measurement of reflections or the joystick itself has a corresponding light source. Otherwise, detection is achieved as follows.

If the operating element is not located in a sealed space, then it is necessary for distinguishing extraneous or ambient light, e.g. from lamps or sunlight, that the light of the transmission sources is pulsed by means of the timing circuit at a frequency above the usual disturbance effects of light bulbs, neon lamps etc, e.g. at 100 kHz. While the essential interferences are eliminated by this, there still remains the so-called "stray light effect". This is a physical process in the photodiode, which results in a change in the received signal amplitude by a few per cent in the range between receipt of the cycled light signal in complete darkness and full sunlight. In practice, this would mean that the position of the cursor on the screen would change by variation in ambient light where an optical movement-sensitive operating surface is used. This unwanted movement of the cursor, e.g. when a lamp is switched on in the vicinity of a movement-sensitive operating surface, would naturally compromise the entire system.

A solution for the compensation of extraneous light has been described in EP 706 648 A1. Essential components of this measurement principle also form the basis of this application, and therefore the disclosure content of that application is expressly also made the subject of the present application.

Figure 3:
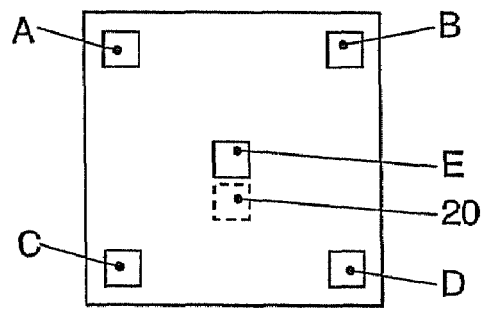

The position of a finger, for example, on a given surface may be determined in the simplest way by two separate sensor elements, which are disposed in a cross-like arrangement, for example, as shown in FIG. 3. One sensor element with the transmitters A,B determines the horizontal position, the other element with transmitters C,D determines the vertical position. Advantageously, the sensor elements are disposed below a surface 12 and emit in the direction of the operating element, e.g. the object O in the form of a finger, for example. The measured values determined from the reflected light then respectively give the horizontal or vertical position of the object outside the operating surface. The principle for one-dimensional position determination is explained in FIG. 1. The transmitters A,B are LEDs, for example, the receiver E is a photodiode, for example, or an appropriately connected light-emitting diode. The transmitters A,B are actuated inverted via the inverter 21. In this case, their power is controlled via the regulating resistances R1,R2 such that a dc light component without cycle-synchronous ac light component is present at the receiver E. However, contrary to EP 706 648 A1, the power ratio of the transmission elements is not intentionally time-delayed, but readjusted as quickly as possible. As a result, an immediate reaction of the control voltage correction for the transmission power of the transmission elements is achieved in the case of a change in position of the operating element, e.g. the object O.

In EP 706 648 A1 only dynamic changes in the control voltage are evaluated. In contrast to this, the static control value is required in the determination of position. In order to obtain this value as independently as possible of thermal influences or ageing influences, the control voltage $U_{R,1}$, $U_{R,2}$ fed to the individual regulating resistances R1 and R2 is tapped for adjustment of the output power and compared with the comparator V III. The value determined via the comparator V III constitutes the electric value of the mechanical position of the operating element, e.g. the finger, in x-direction. The signal detected by the receiver E is fed to a high-pass filter 23 and compared in cycles by means of a synchronous demodulator 22 and subsequent comparison in the comparator V II. When an object O is present, a value for the control voltage fed to the regulating resistances R1, R2 results in the comparator V I.

Without the presence of the object O the parasitic reflection PR with an appropriate structure will scatter approximately equal components of the transmission power of A and B reciprocally to the receiver E. In this case, the control voltage remains virtually unaffected, i.e. at zero. If a finger approaches asymmetrically to the center, the control loop tries to adjust the light power so that a dc light signal without ac light components is once again present at the receiver E. This leads to a shift in the control voltage symmetry at the regulating resistances R1, R2 and thus also to an output signal at the comparator V III to the right or left of the center point of the mechanical arrangement, depending on the positioning of the finger. The output signal assumes more or less positive or negative values, as is illustrated at the bottom right of FIG. 1 on movement of a finger.

A sufficiently favorable linearity of the output signal in relation to the position of the operating element, e.g. the finger, on the optically relevant path can be achieved by appropriate arrangement and selection of the optical elements.

Figure 2:
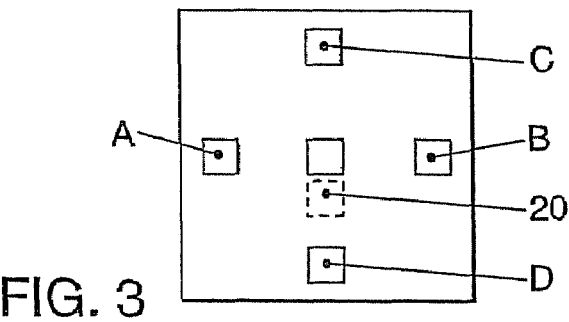
FIGS. 2-4 show various arrangements of the transmitters and receivers

The measurement path shown in FIG. 2, which was also used in FIG. 1, can, of course, only fulfill a one-dimensional function, e.g. as optical slider control or slide switch, wherein only the lateral change in the position of a finger, for example, is detected. For two-dimensional detection of the position, two separate measurement paths, which are displaced as far as possible 90° to one another, are required according to FIG. 3. The receiver E can be used for both measurement paths, i.e. A,B and C,D, together. In this case, the light path in x-direction and the light path in y-direction are alternately cycled reciprocally. This can occur by switching over after several respective cycle periods, e.g. 30×A/B and then 30×C/D, or by switching over after each basic cycle. All that is important is that the measured value output is accordingly associated with the respective basic cycles.

Figure 4:
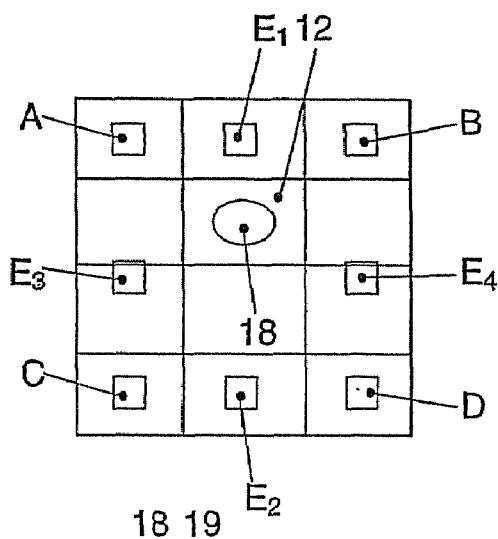

In the simplest case, a cross-like form is given for the arrangement of the optical elements for determination of position. However, a non-linearity can occur in the corner regions with a corresponding size of the operating surface. While this can be easily corrected via corresponding arithmetic operations, a favorable linearity may also be achieved without any arithmetic operation by an appropriate arrangement of the transmission elements, if the transmitters are arranged as shown in FIG. 4, for example. During each basic cycle more than one transmitter lights up, e.g. in the first cycle transmitters A,C alternately with B,D to determine the horizontal position, in the further basic cycle transmitters A,B alternately with C,D to determine the y-position. The number of light-emitting diodes can naturally also be increased accordingly in FIG. 4, e.g. for use of this function over a large space. On this basis the arrangements in FIGS. 3 and 4 may also only be used to determine the position in x- and y-direction.

For detection of the third dimension, with a flat arrangement of surface 12, the position of the object is to be determined in relation to the surface 12. This position should be independent of the color of the finger or object O. If a virtually flat arrangement of the optical elements is assumed, i.e. that no transmitters or receivers project upwards from the surface 12, determination of the position of the object O can essentially only occur by reflection R. However, since at least the reflection characteristics of the object O influence the measured values, different reflective objects at different distances d from the surface 12 would provide the same reflection values, and therefore an exact determination of position in the third dimension would not be unequivocal. In principle, the determination of a function of the third dimension is useful working from the mechanical contact plane, i.e. from the surface of the area 12, and this function should then be virtually independent of size, color or type of the object. However, it should be indicated at this point that according to the invention a physical contact plane does not necessarily have to exist. The "surface" 12 can also be imaginary in the air so that the operating element penetrates the surface, passes through it and partially even shades the receivers.

To determine the position in the third dimension, at least one further basic cycle is added to the two basic cycles to determine the x-value and y-value of the position of the operating element on the surface 12. In this basic cycle the transmitters A-D are actuated so that they all or at least a part of them receive the same cycle signal, i.e. light up simultaneously. It is not necessary in this case that they are controlled individually, as is necessary for determination of the position in the x- and y-direction. Moreover, at least one further light source 20 is disposed as compensating element in the vicinity of the receiver or receivers E,E1-E4 such that the light emitted by this further light source radiates virtually exclusively into the receivers. However, if extraneous light is of no significance, these compensating elements may be omitted.

From older DE 100 01 955 A1, the arrangement of two light sources is known in such a form that approach of an object and the movement pattern on touching the operating surface are clearly recognized. This arrangement is basically also used here for recognition of the touching signal, but in place of the one light source radiating outwards, several, preferably all transmitters and also receivers, if necessary, are now used for the radiation outwards. The aim is to illuminate the space above the surface 12 as uniformly as possible.

When the object O approaches the surface 12, this is recognized by recognition elements 14 and can activate determination of the position in x- and y-direction, for example. When the surface 12 is touched, the change in speed is recognized by the recognition elements and can be relayed as touching signal AS1 in FIG. 7. This signal can, for example, activate an operating element 30 such as a cursor on the screen, for example. At the same time as the touching signal AS1 appears, according to FIG. 7 a value derived from the value of the 3D signal 3-D-S is stored in a storage means 13 such as a digital memory, for example. This value serves as reference value $Ref_{3D}$ for the maximum approach of the object O. It is to ensure that the smallest movements of the operating element or finger are not again evaluated as lifting. Since when the surface 12 is touched with an object O, e.g. a finger, this is possibly slightly deformed, the maximum value of the reflection R, if detected in this instant, could readily be higher than the value with a finger laid gently thereon. Therefore, the value is stored shortly before the surface 12 is touched. A function of the third dimension is then only achieved when the finger is more than one millimeter away from the surface, for example. This increases the operating reliability, in particular if the finger is moved or slightly rolled with varying pressure during movement over the surface. Therefore, the movement pattern when the surface is touched is recognized, wherein preferably a reference value is determined, which corresponds to the value of the respective operating element, i.e. the object, when lying on the operating surface or shortly before lying on it. The operation in the third dimension can then occur as a function of this reference value. If a specific threshold is no more reached in this case, the operating element has moved so far from the operating surface that this is regarded as a switch-off signal and thus as erase signal for the reference value.

Figure 7:
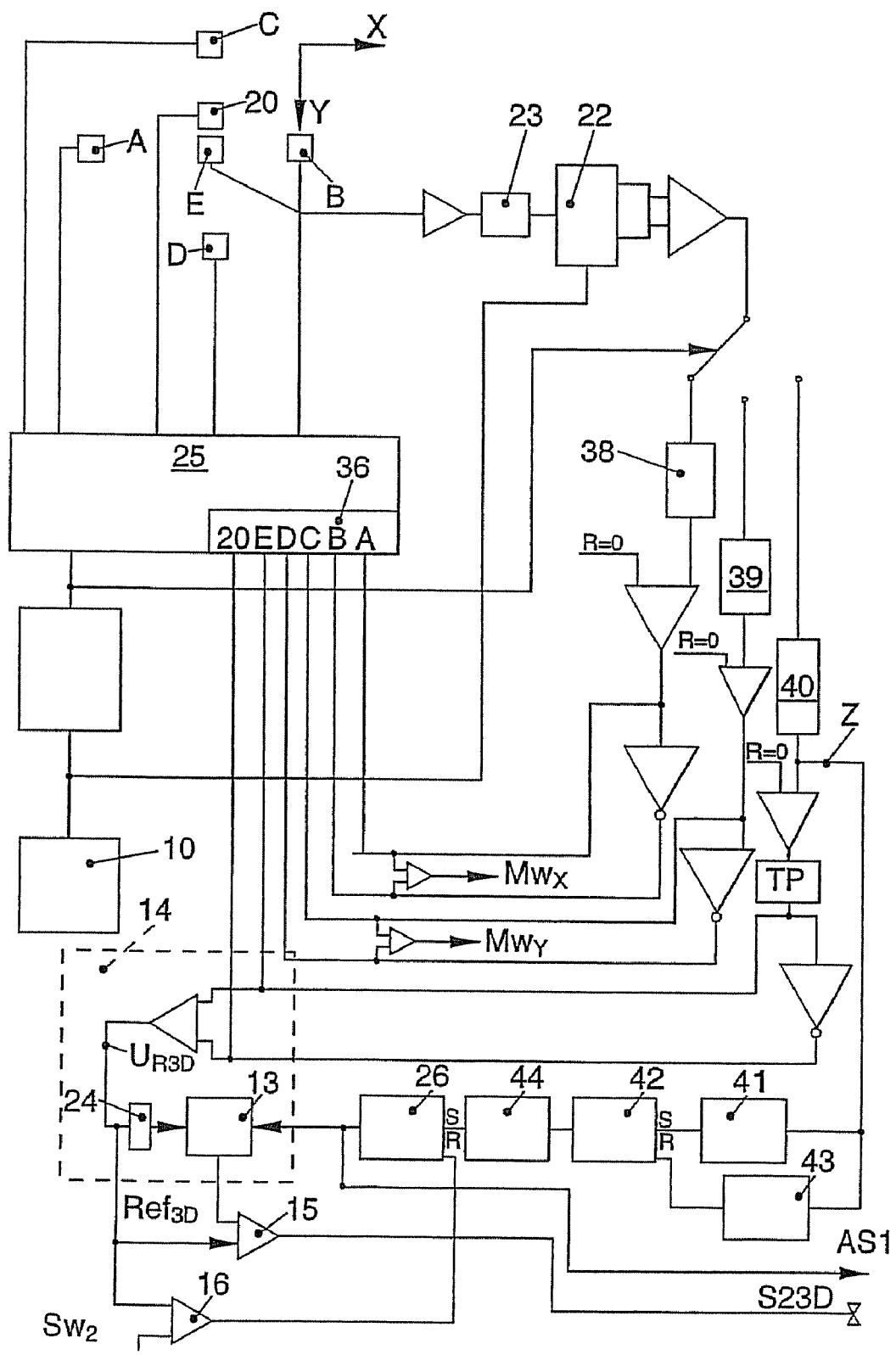
FIG. 7 shows a circuit for three-dimensional position determination

Detection of the measured value $Ref_{3D}$ can be achieved via a delay circuit by means of the circuit 24, or a specific given value can also be deducted from $Ref_{3D}$. To determine this value, which, however, may also already be the actual maximum value at maximum proximity, the detected value can firstly be multiplied by a fixed multiplier less than 1. However, the circuit shown at the bottom right in FIG. 7 is used in the practical example. Whereas the x- and y-values are present in the storage means 38 and 39, the z-value is present in the storage means 40. This z-value is directed via a touch pulse recognition 41, which sets the flip-flop 42. If the z-value is set by mistake as a result of an unintentional movement, this is detected via the threshold detection means 43 and the flip-flop 42 is reset before the value directed via the time-delaying circuit 44 sets the flip-flop 26, which then indicates to the storage means 13 that the now present voltage value is used as reference value $Ref_{3D}$. This embodiment has the advantage that the reference value $Ref_{3D}$ is adapted to the human factor. Namely, if the previous movement is performed quickly—in the case of a more hasty user-, a larger interval results between the maximum value and the reference value than in the case of a user approaching the device more cautiously.

Every movement away from the surface 12 leads to a change in the control voltage $U_{R3D}$. Therefore, the difference between the stored value $Ref_{3D}$ and the current control voltage $U_{R3D}$ gives the analog output signal S2 3D. The signal S2 3D is proportional to the distance of the object O from the surface 12. Via a comparator the recognition elements 14 detect the radiation radiated directly into the receiver in the further light source 20 provided for compensation as well as the reflected radiation, wherein actuation is achieved according to cycle distribution. As is known from the older Patent Application 100 01 955.2, the first signal is firstly delayed by a given time quantity via a circuit 24 before it is then stored in the digital memory 13, for example. Further values are then compared with this reference value in the comparison means 15.

In many cases it is useful to recognize not only the touching of the surface 12, but also when the finger has moved, for example, more than 30 mm from the surface. This is performed with a further threshold detection within the comparator 16. If the threshold SW2 is not or no more reached, the flip-flop 26 is reset and the reference value $Ref_{3D}$ deleted and the control signal AS1 reset. The threshold value SW2 can also be a value derived from the reference value $Ref_{3D}$.

Figure 12:
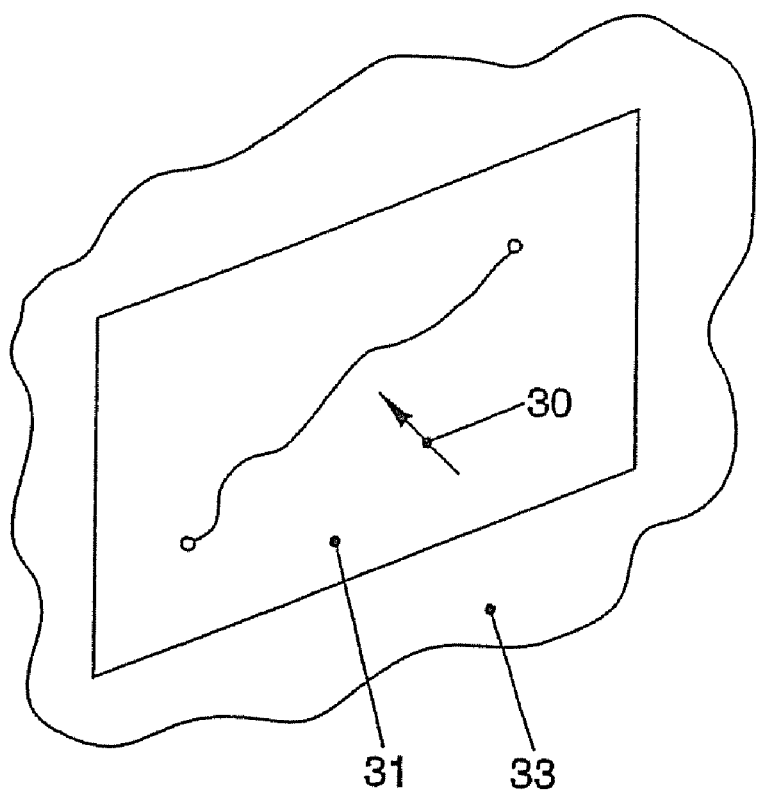
FIG. 12 shows use of the device in a motor vehicle.
Figure 12:
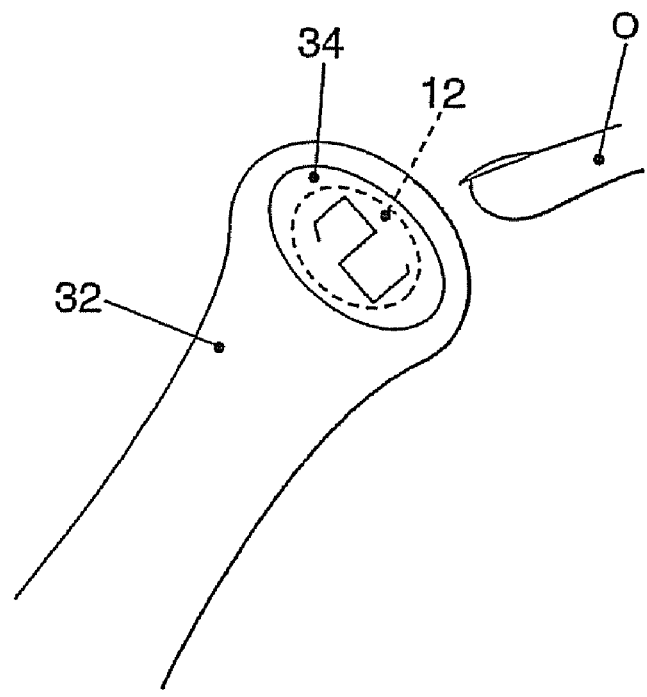

A practical example of such a device is shown in FIG. 12. This relates to the parts of a vehicle 33, i.e. a gearshift selector 33 or gear lever, on which—in this case on the top of the lever—an optical display 34 is disposed for display of the selected gear. The vehicle also has a navigation system 31, which may be controlled from the gearshift lever 32. For this, the display 34 is at the same time configured as a surface 12 of a movement-sensitive operating surface, which is connected to the navigation system, for example. Hence, the detail enlargement in the region of the operating element 30 or the cursor of the navigation system 31, for example, may be controlled by lifting the operating element, e.g. the finger or object O, slightly from the operating surface. Advantageously, at the same time the zoomed path can be moved accordingly by movement of the finger. For example, if the display of the navigation system 31 is disposed in the viewing range of the driver, then to search the route, for example, the driver only needs to move a finger over the surface 12 or roll a fingertip. To enlarge a path of the map of the navigation system 31, he lifts the finger without having to take his hand off the gearshift lever 32 and without having to operate further operating elements. The risk of distraction of the driver is clearly reduced. The surface 12 can be so small that to operate the operating element 30 the finger is essentially no longer moved or shifted, but rolled. In this case, the operating surface may not be substantially larger than a fingertip, for example. The surface 12, which is approximately equal in size to the contact surface of the object O, can be round or arched. It can, of course, also have any other form, e.g. flat, almost round. If required, it can also have a structure, which allows the center of the surface to be touched.

Figure 5:
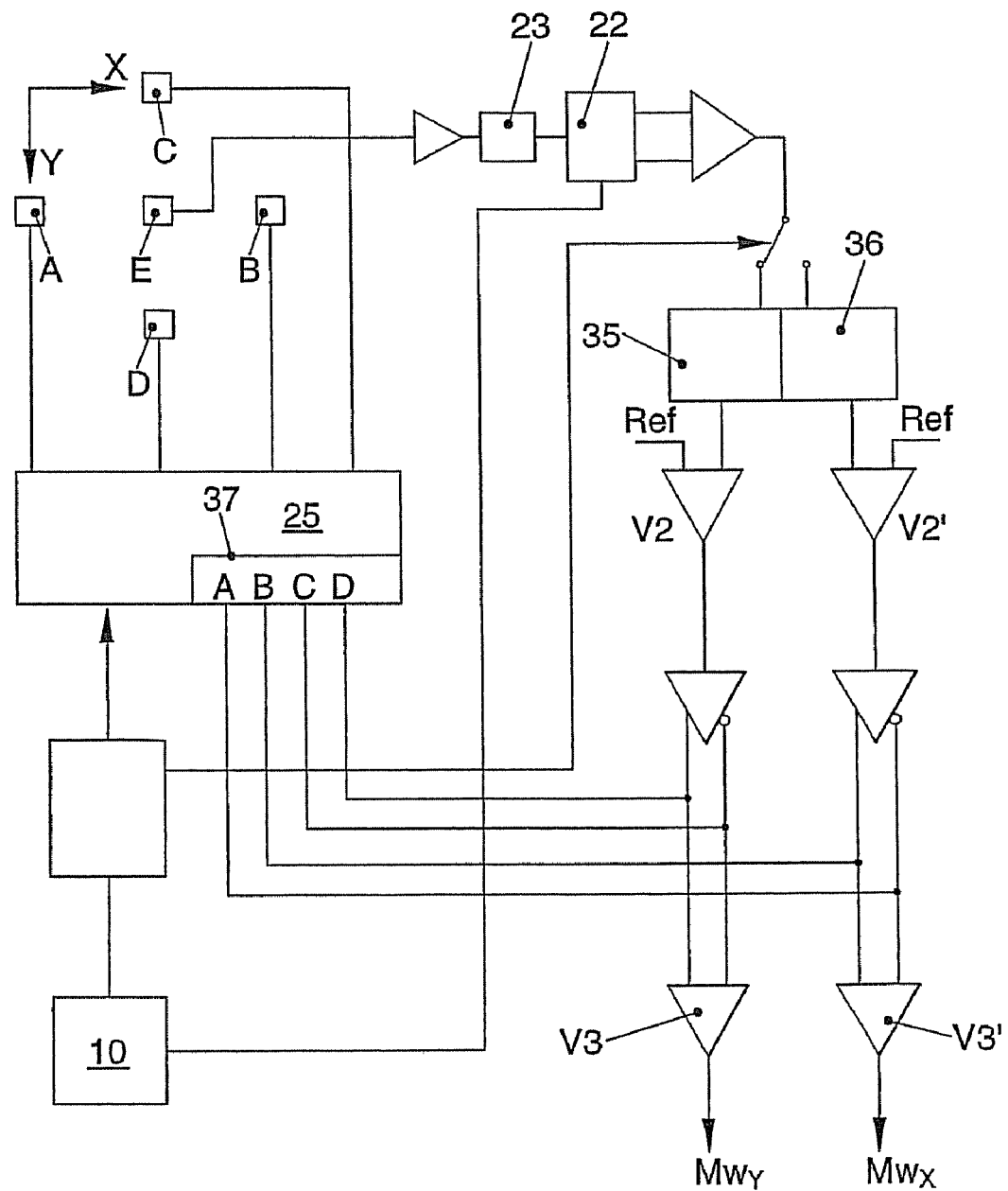
FIG. 5 shows a circuit for a two-dimensional position determination
Figure 6:
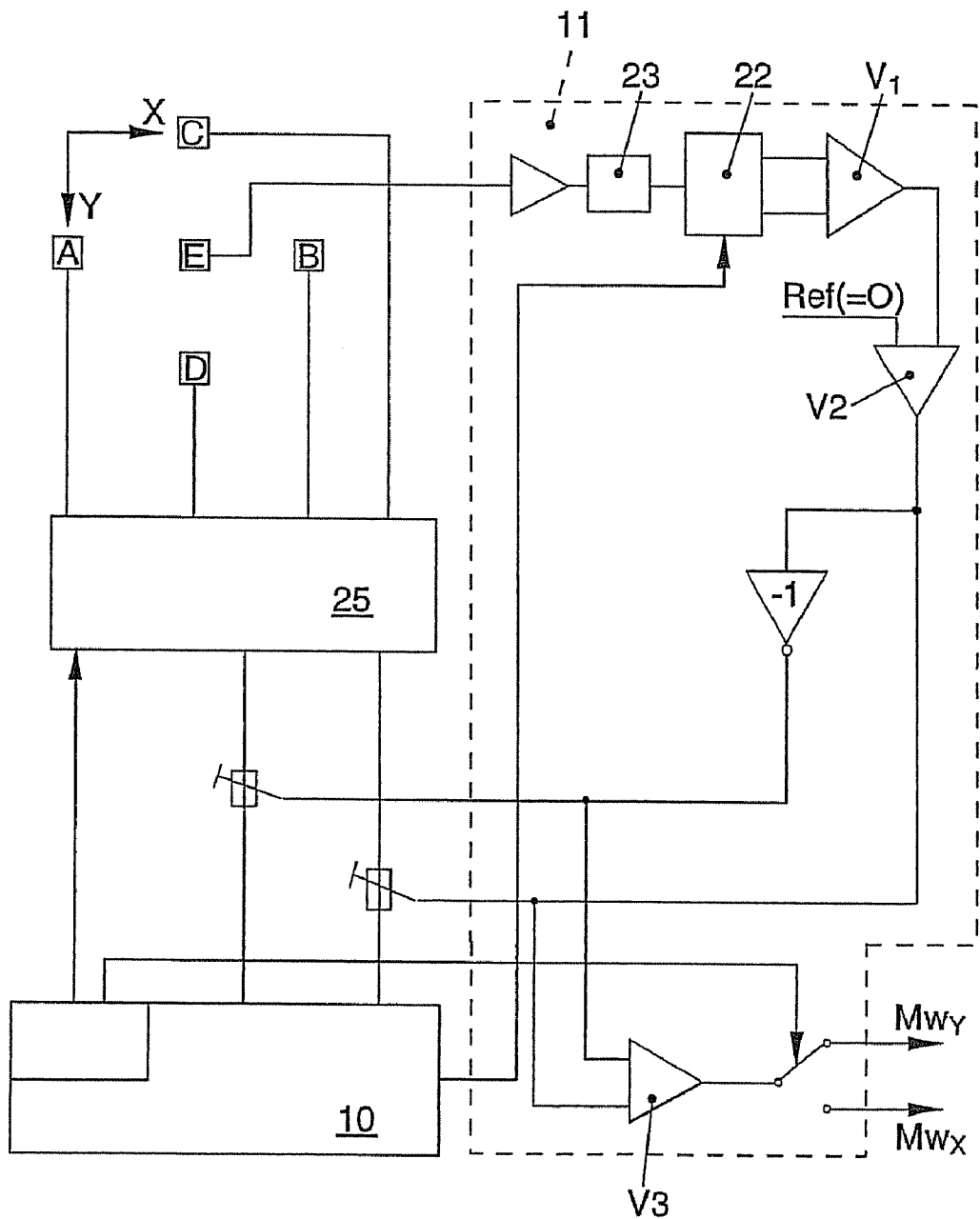
FIG. 6 shows an alternative circuit to FIG. 5

A two-dimensional circuit, which has the same structure as the one-dimensional circuit according to FIG. 1, is shown in FIGS. 5 and 6. The timing circuit has a cycle distributor 25, which not only actuates the respective transmitters and receivers, but at the same time also actuates the power controls 36 accordingly so that the corresponding measured values $Mw_x$ and $Mw_y$ can be detected by the comparators V2, V2' and V3, V3'.

In some cases, e.g. in the use of a movement-sensitive operating surface, an arrangement of the receiver E according to FIGS. 2 to 4 may be inconvenient, e.g. if the surface of the movement-sensitive operating surface is not permeable to the wavelength of the position finding. Since the operating surface can be made of transparent plastic, the arrangement of a further optical display unit, for example, is possible without impairing vision, as has already explained previously for the arrangement of a display for the selected gear of a vehicle. If this further display unit is impermeable to the wavelength provided for the movement-sensitive operating surface, the receiver E cannot be disposed in the center of the surface, but must be disposed on the edge, for example. According to FIG. 8, a plurality of receivers may also be disposed so that, together with the transmitters A-D, they respectively form one or several light paths. Thus, the transmitters A,C with receivers E2 or E4 alternately with the transmitters B,D and receivers E1 or E4 can form a light or measurement path for determination of the x-value. An arrangement is also conceivable, wherein the transmitters A,C are operated alternately with the transmitters B,D and the receivers E3, E4. The number and arrangement of the receiving elements are merely relative to the symmetry of the output signal for the x-value and the y-value as well as the 3D value. It basically applies that several or all, but at least one receiver E1-E4, receive the signal emitted by the transmitters A-D. With few structural elements it is possible to arrange receiving elements not only centrally between the transmitters, but also on the edge of the operating surface.

Since a light-emitting diode, such as that used here for radiating the light, can generally also be switched as receiver, when light-emitting diodes are used as receivers E1-E4, these can naturally also be intermittently operated as transmitters. This can then result in an arrangement, in which, for determination of the position of the x-value, for example, the transmitters A,C together with the receiver E3 light up alternately with the transmitters B,D together with the receiver E4, while receivers E1 and E2 serve as receivers. A corresponding arrangement then results for determination of the y-value.

According to FIG. 6, the receivers are connected in parallel or their output signals are brought together with appropriate circuit arrangements. Since the two receivers E1,E2 or E3, E4 do not lie at the same location, it can happen that one receiver is exposed to different light conditions from the other (sun and shade). So long as the light conditions are stable, the asymmetric illumination with an arrangement of the transmitting elements that is by chance not exactly symmetrical will only be expressed in an additional slight asymmetry of the output signal of the finger position. However, this effect becomes disruptive, if, for example, the movement-sensitive operating surface is operated in constantly changing brightness conditions such as in a traveling automobile, for example.

To eliminate this effect, the arrangement of the transmission and receiving elements in a movement-sensitive operating surface is arranged such that only one receiver per light path is respectively used. According to FIG. 8, only receiver E1 is used, for example, for determining the position of the x-value, in which case the transmitters A or A,C light up alternately with the transmitters B or B,D. However, with a large surface the position can only be clearly determined in the upper region in the drawing in this case. Therefore, the receiver E2 is used in a further measurement cycle, in which case the transmission elements C or A,C light up alternately with the transmitters D or D,B. In this second measurement cycle, the position in the lower part of the movement-sensitive operating surface can now be unequivocally determined. The measured values of the first and second cycle are now combined and together give the extraneous light-independent measured value for the x-value of the object O. Therefore, with this arrangement, two measured values for the x-direction and two measured values for the y-direction are respectively generated one after the other and subsequently averaged. Determination of the y-value is achieved analogously thereto.

Figure 8:
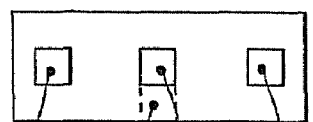
FIG. 8 shows an alternative arrangement of the transmitters and receivers with superposed identification field matrix
Figure 9:
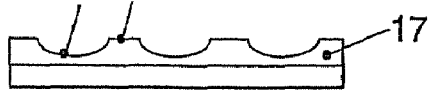
FIG. 9 is a side view of the representation according to FIG. 8

A further alternative for the use of only one receiver E1-E4 consists in the differently weighted actuation of the transmitters. In FIG. 8, for example, only receiver E1 is used for determination of the x-value. The transmitters located closest to the receiver, i.e. transmitters A,B, would be actuated with appropriately reduced power, e.g. with 30% of their maximum power. The transmission elements located furthest away, i.e. transmitters C,D, then transmit at their maximum power of 100%. If the receivers E3, E4 are also operated as transmitters, then they radiate at 70%, for example. A virtually linear behavior of the electric positioning signal in relation to the actual mechanical position of the object O is achieved as a result of the weighted actuation. Naturally, all these measures may be omitted, if a correspondingly corrected output value is emitted via corresponding arithmetic operations to each measured x- and y-value. This is of advantage above all in large-surface applications. This arrangement can also be used for only two-dimensional position determination in the x- and y-direction.

Compensation of the receiving signal to zero can also be omitted in the determination of the third dimension, if a further operating plane is switched to, for example, only by moving the finger away. The sensitivity to extraneous or ambient light arising in this case has scarcely any effect with a low number of fixedly assigned functions in the third dimension, e.g. if only a second operating plane is switched into by lifting the finger or operating element.

FIG. 8 shows a further alternative, if only a restricted number of position allocations is useful, for example, in the case of a movement-sensitive operating surface, as is possible, for example, in the case of a 12-field keyboard field. The display of possibly necessary compensating means in the form of further light sources 20 has been omitted. Fields with printed numbers thereon can easily lead to erroneous operations, if the object cannot feel the key and by chance lands between two fields. To eliminate this error, the surface 19 of the movement-sensitive operating surface can have recessed or raised or otherwise feelable translucent identification fields 18 with regions that are impermeable to the radiation located between them. Touching of a key surface, i.e. an identification field 18, then leads to a touching signal with simultaneous information with respect to the x- and y-value. If the position is simultaneously recognized with the arrival of the touching signal, a corresponding number or function can be clearly assigned to this measured value plus a specific tolerance range. In this case, a decisive advantage is obtained over mechanical keyboards, since in the ideal case the keyboard in an embodiment according to FIG. 2 or 3 can be operated with only three to four inexpensive LEDs and a receiver, which may be a photodiode, but preferably also an LED, which can assume the illumination and at the same time the key function. This identification field and sector function may also be used alone without determination of the distance, if solely a two-dimensional application is desired, i.e. when only recognition of the identification fields is important, for example. The operating surface can also be provided with a partially opaque coating or covering, so that distinct identification fields can be recognized even with only 3 to 4 LEDs and a receiver, which can be a photodiode or a light-emitting diode.

In the ideal case, four LEDs are sufficient, one in each corner region of the then square surface, if according to FIG. 4, for example, the transmitters A and C are cycled alternately and the transmitters B or D as LEDs are used alternately as receivers. The alternately obtained receiving signal of the transmitters B or D (here: receivers) or the control magnitudes are combined and provide a first measured value of the y-direction. To improve the linearity or to optimize the measured results, the measurement path B/D can be switched with the transmitters A or C as receivers alternately with the measurement path A/C with the transmitters B or D as receivers. The respectively alternately obtained measured results are combined again and give a linearised measured value of the y-axis, which is completely independent of extraneous light. The same is repeated analogously for the x-axis.

To obtain the z-value of the third dimension, the transmitters A and C are simultaneously cycled, whereas transmitter B is operated as receiver and transmitter D is operated as compensating LED (analogously light source 20). To improve the linearity, alternately with the measurement path A and C (simultaneously cycled), transmitter D can be operated as receiver and transmitter B can be operated as compensating LED (analogously light source 20), i.e. transmitters B and D are interchanged in their function compared to the first connection. The values or control magnitudes obtained from these two measurements are combined and give a first z-value. Analogously thereto, transmitters B and D (simultaneously cycled) are operated alternately with transmitters A and C reciprocally once as receiver and once as compensating LED for determination of a second z-value. For determination of a third and fourth z-value, the same applies analogously with use of transmitters A and B or C and D as simultaneously cycled transmitters and the respective other two transmitters are operated as receiver or compensating LED. If all four z-values are used, then such a switching sequence can analogously occur in sequence in few microseconds, in which case each transmitter is operated in paths not only as transmitter but also as receiver or compensating LED. Upon corresponding evaluation of the measured values obtained overall, from the above-described arrangement the x-, y- and z-position can be calculated from only one circuit by calculating corresponding results together. If the determination of the z-value in the third dimension is not important, this arrangement can also be used by itself to determine the x- and y-position.

Moreover, a proximity function can be achieved, in which the object can be recognized, for example, if it is located on an identification field 18 or some centimeters or millimeters above this. This can be used during blind operation, for example, for switching on the illumination or for acoustic acknowledgement as to which key the finger is currently positioned on, if, for example, a function is selected in the automobile in darkness without the keyboard being visible. If the corresponding identification field 18 is then touched, a further function is triggered with the same means. Such a keyboard does not contain any mechanical parts, the light-emitting diodes can be integrated on an electronics board and only require translucent regions corresponding to the keys. This reduces manufacturing costs as well as the possibility of faults while at the same time being insensitive to water or sand or dust. If required, the keyboard field with 12 keys can also be folded away and a movement-sensitive operating surface is even obtained, e.g. for input of an entire rough travel route with a finger. The user can thus, for example, roughly trace the desired stages and the route on the map with a finger and the navigation system calculates a proposed route from this.

Figure 10:
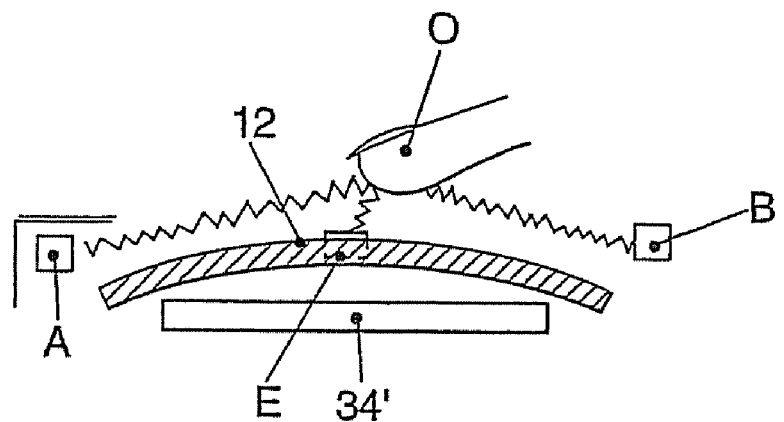
FIGS. 10,11 show a further embodiment of an arrangement in sectional and top view
Figure 11:
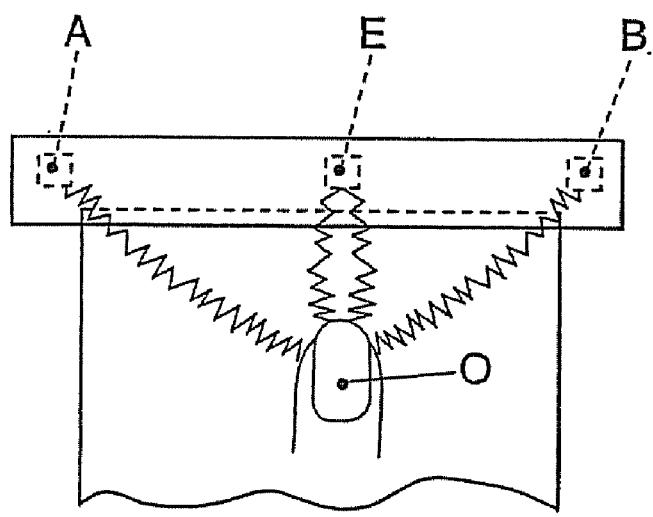

According to FIGS. 10, 11 it is not absolutely essential for the transmitters A,B and receiver E to be disposed below the surface 12. If a display 34' or another structural element, which can at the same time not be penetrated by radiation, is located there, for example, the transmitters and/or receivers can also be disposed above the surface. The separating medium is then not the surface 12 but air or another medium. The transmitters and receivers can be protected by a covering 41 and merely emit and receive radiation through a gap between the surface 12 and the covering 41, or be coupled out by a corresponding, if necessary, angled, light guide means on the operating surface.

In principle, the detection of the x- and y-values can also be achieved using the compensating means in the form of the further light source 20 and the detection of the z-value may also be achieved without compensation.

Operational tests have shown that despite the complex switching sequence, this optoelectronic detection of position can be performed without problem. The individual measurement paths can be operated in microseconds so that a reliable and favorable position detection is possible.

It is self-evident that this description can be subject to a wide variety of modifications, changes and adaptations, which move towards equivalents to the attached claims.

The invention claimed is:

1. Optoelectronic device for detecting the position and/or movement of an object, the device comprising:
    a plurality of transmitters for emitting radiation, wherein each of said plurality of transmitters is disposable in at least one of a plurality of different groups of transmitters, said different groups being configured to emit radiation both simultaneously and/ time shifted,
    at least one receiver configured to receive the radiation emitted by the transmitters and reflected back by the object or the radiation emitted from transmitters associated with the object, wherein the radiation is transmittable between any and each of the transmitters and any and each the at least one receiver;
    a plurality of mutually different radiation paths, which are formed between at least a part of the transmitters, the object and the at least one receiver or between transmitters associated with the object and the at least one receiver,
    a timing circuit for cycled switching of the transmitters of the different radiation paths,
    an evaluation device, which converts the signals received by the at least one receiver for the different radiation paths into values for detection of the position and/or movement of the object along a line or in a surface,
    wherein for three-dimensional detection of the position and/or movement of the object, the timing circuit switches the plurality of or at least a part of the transmitters and/or the at least one receiver in at least one further cycle such that the space, into which the transmitters emit, is illuminated nearly uniformly, and that the evaluation device determines a value for determination of a distance of the object from the line or surface on the basis of the radiation radiated or radiated back by the object during the further cycle.

2. Device according to claim 1, wherein the at least one receiver and the transmitters lie in one plane.

3. Device according to claim 1, wherein the at least one receiver and the transmitters are disposed below an operating surface forming the surface, and that the transmitters and/or the at least one receiver emit into the space beyond the operating surface in a further cycle.

4. Device according to claim 1, wherein at least four transmitters are disposed in a cross-like arrangement, being operated alternately cycled crosswise for two-dimensional detection.

5. Device according to claim 1, wherein a further light source is disposed as transmitter in the vicinity of the at least one receiver so that the light of the further light source radiates into the receiver.

6. Device according to claim 1, wherein the radiation paths are light paths that are actuated alternately, and that the evaluation unit controls the power of the transmitters with a power control means essentially without delay such that a dc component without cycle-synchronous ac component is present at the receivers.

7. Device according to claim 1, wherein control elements are associated with the transmitters, which control elements have control voltages that are sampled and fed to a comparator for determination of a position value.

8. Device according to claim 1, wherein recognition elements are provided, which recognize the movement pattern when the surface is touched, and that storage means store a value of radiation emitted back as a reference value when the surface is touched.

9. Device according to claim 8, wherein comparison elements are provided, which determine the distance of the object from the surface by a comparison between the reference value and the current value.

10. Device according to claim 9, wherein a value occurring shortly before the object impinges upon the surface is stored as the reference value.

11. Device according to claim 1, wherein the device recognizes the approach of the object and effectively switches the position detection to be effective by changing the basic cycles.

12. Device according to claim 8, wherein the storage means stores the reference value and deletes it if a comparator determines that the current value falls below a given value or a value derived from the reference value.

13. Device according to claim 1, wherein the transmitters are disposed at the corners of the surface and the at least one receiver between the transmitters.

14. Device according to claim 13, wherein two respective transmitters disposed at adjacent corners of the surface together with the receivers located between them form a measurement unit, and that the transmitters and receivers lying opposite one another for determination of a respective value in x- or y-direction are operated alternately.

15. Device according to claim 1, wherein for determination of an x-value or a y-value of the position of the object in the surface, two receivers lying opposite one another relative to the surface are provided, which alternately supply measured values, which are averaged to determine the position.

16. Device according to claim 1, wherein identification fields that may be unequivocally assigned are formed in the surface and that on approach of the object to the identification field, recognition elements recognize the object and, depending on the identification field, reproduce a characteristic identification for the identification field and trigger a further function in the case where touching has occurred.

17. Device according to claim 1, wherein four light-emitting diodes illuminate the surface simultaneously and at least intermittently serve as receiver or compensating element.

18. Device according to claim 1, wherein the object is a body part, preferably a finger of a user, and that the surface is so small that the finger is essentially not shifted, but rolled for operation of an operating element.

19. Device according to claim 1, wherein the surface, which is of about equal size compared to a contact surface of the object, is round and arched.

20. Device according to claim 1, wherein the transmitters and the at least one receiver are disposed above the surface or radiate or receive light above the surface via light-conducting elements, wherein the medium separating the transmitters, receivers and the object is air or another medium, which the radiation may radiate through.

21. The device of claim 1, wherein said at least one receiver is a plurality of receivers.

22. Method for detecting the position and/or movement of an object optoelectronically with a device with
a plurality of transmitters for emitting radiation, wherein each of said plurality of transmitters is disposable in at least one of a plurality of different groups of transmitters, said different groups of transmitters being configured to emit radiation simultaneously and time shifted,
at least one receiver configured to receive the radiation emitted by the transmitters and reflected back by the object or the radiation emitted from transmitters associated with the object, wherein the radiation is transmittable between any and each of the transmitters and any and each the at least one receiver;
a plurality of mutually different radiation paths, which are formed between at least a part of the transmitters, the object and the at least one receiver or between transmitters associated with the object and the at least one receiver,
a timing circuit for cycled switching of the transmitters of the different radiation paths,
an evaluation device, which converts the signals received by the at least one receiver for the different radiation paths into values for detection of the position and/or movement of the object along a line or in a surface,
wherein for three-dimensional detection of the position and/or movement of the object, the timing circuit switches a plurality of, or at least a part of the transmitters and/or the at least one receiver in at least one further cycle such that the space, into which the transmitters emit, is illuminated nearly uniformly, and that the evaluation device determines a value for determination of a distance of the object from the line or surface on the basis of the radiation radiated or radiated back by the object during the further cycle.

23. Method according to claim 22, wherein the transmitters and/or the at least one receiver disposed below an operating surface forming the surface emit into the space beyond the operating surface in a further cycle.

24. Method according to claim 22, wherein at least four transmitters disposed in a cross-like arrangement are operated alternately cycled crosswise for two-dimensional detection.

25. Method according to claim 22, wherein in the further cycle a further light source as transmitter in the vicinity of the at least one receiver radiates light into the at least one receiver to compensate.

26. Method according to claim 22, wherein the radiation paths are light paths that are actuated alternately, and that the evaluation unit controls the power of the transmitters with a power control means essentially without delay such that a dc component without cycle-synchronous ac component is present at the at least one receiver.

27. Method according to claim 22, wherein for assessment of the position, control voltages are sampled at control elements associated with the respective transmitters and fed to a comparator for determination of the value.

28. Method according to claim 22, characterized in that recognition elements recognize the movement pattern when the surface is touched, and that storage means store the determined value of radiation emitted back as a reference value.

29. Method according to claim 28, wherein comparison elements determine the distance of the object from the surface by a comparison between the reference value and the current value.

30. Method according to claim 29, wherein a value occurring shortly before the object impinges upon the surface is stored as the reference value.

31. Method according to claim 22, wherein the device recognizes the approach of the object and effectively switches the position detection to be effective by changing the basic cycles.

32. Method according to claim 28, wherein the storage means stores the reference value and deletes it again if a comparator determines that the current value falls below a given value or a value derived from the reference value.

33. Method according to claim 22, wherein two respective transmitters disposed at adjacent corners of the surface together with the receivers located between them form a measurement unit, and that the transmitters and receivers lying opposite one another for determination of a respective value in x- or y-direction are operated alternately.

34. Method according to claim 22, wherein for determination of an x-value or a y-value of the position of the object in the surface, two receivers lying opposite one another relative to the surface alternately supply measured values, which are averaged to determine the position.

35. Method according to claim 22, wherein on approach of the object to at least one identification field that is unequivocally assigned and is formed in the surface, a recognition elements recognize the object and, depending on the identification field, reproduce a characteristic identification for the identification field and trigger a further function in the case where touching has occurred.

36. Method according to claim 22, wherein the object is a body part, preferably a finger of a user, and that the surface is so small that the finger is essentially not shifted, but rolled for operation of an operating element.

37. The method of claim 22, wherein said at least one receiver is a plurality of receivers.

* * * * *